United States Patent
Hill

(10) Patent No.: US 9,585,367 B2
(45) Date of Patent: Mar. 7, 2017

(54) FETCHPRO AN ADJUSTABLE DOG TOY GRIPPING AND THROWING DEVICE

(71) Applicant: Justin Garrett Hill, Los Angeles, CA (US)

(72) Inventor: Justin Garrett Hill, Los Angeles, CA (US)

(73) Assignee: Justin Garrett Hill, Los Angeles, CA (US)

( * ) Notice: Subject to any disclaimer, the term of this patent is extended or adjusted under 35 U.S.C. 154(b) by 0 days.

(21) Appl. No.: 14/531,500

(22) Filed: Nov. 3, 2014

(65) Prior Publication Data

US 2016/0120148 A1    May 5, 2016

(51) Int. Cl.
*A63B 65/12*    (2006.01)
*A01K 15/02*    (2006.01)

(52) U.S. Cl.
CPC .............. *A01K 15/02* (2013.01); *A63B 65/12* (2013.01); *A63B 65/122* (2013.01)

(58) Field of Classification Search
CPC .... B25B 9/00; B25B 9/02; B25B 9/04; B25B 5/068; B25B 5/14; B25B 5/102; B25D 3/00; A63B 65/12; A63B 65/122
USPC ......................................................... 81/487
See application file for complete search history.

(56) References Cited

U.S. PATENT DOCUMENTS

| | | | | |
|---|---|---|---|---|
| 1,744,197 A | * | 1/1930 | Anderson | B25B 5/102 269/147 |
| 2,625,848 A | * | 1/1953 | Davies | B25B 9/04 294/131 |
| 3,921,477 A | * | 11/1975 | Wilson | A01G 3/065 30/241 |
| 4,307,909 A | * | 12/1981 | Yaworski | B25B 9/04 294/103.1 |
| 4,449,743 A | * | 5/1984 | Pankratz | B27B 29/00 294/103.1 |
| 5,460,366 A | * | 10/1995 | Pugh | A63B 47/02 294/19.2 |
| 2005/0082730 A1 | * | 4/2005 | Murray | B25B 5/067 269/166 |
| 2005/0263962 A1 | * | 12/2005 | Roh | A01K 15/025 273/317 |
| 2006/0091682 A1 | * | 5/2006 | Kerr | A63B 47/02 294/19.2 |
| 2008/0086852 A1 | * | 4/2008 | Hall, Jr. | B23K 37/0435 24/528 |
| 2012/0006309 A1 | * | 1/2012 | Levin | A01K 15/025 124/5 |
| 2014/0035305 A1 | * | 2/2014 | Ludwig | B25J 1/04 294/200 |
| 2015/0107424 A1 | * | 4/2015 | Chen | B25B 5/14 81/487 |

* cited by examiner

*Primary Examiner* — John E Simms, Jr.

(57) ABSTRACT

An improved dog toy gripping and throwing device wherein the gripper can be adjusted to accommodate gripping different size and shape dog toys.

1 Claim, 4 Drawing Sheets

FETCHPRO AN ADJUSTABLE DOG TOY GRIPPING AND THROWING DEVICE

PRIORITY INFORMATION

This application claims priority from U.S. Provisional Application No. 61/899,612, filed on Nov. 4, 2013, by the inventor Justin Garrett Hill, the contents of which are hereby incorporated by reference.

BACKGROUND OF THE INVENTION

Many dogs love to play fetch, and people love making dogs happy by playing fetch with them. There are currently many different size and shape dog toys that dogs enjoy fetching. However the problems of dog saliva or otherwise filthy dog toys, the energy required and fatigue generated by bending down to pick up and then throw a toy, and the possibility of an overly eager or toy possessive dog biting the hand of the human trying to pick up the toy, are factors that inhibit people from playing fetch with dogs. While there is prior art in the field of ball throwers for fetch, namely tennis ball throwing devices, tennis ball throwing devices are limited with their static design and are only good at picking up and throwing one size and shape ball. This devices are generally not capable of gripping football shape toys, or gripping and throwing plush toys for example.

BRIEF SUMMARY OF THE INVENTION

To overcome the problems mentioned in the "background of the invention" the present invention improves upon prior art in this field because the invention contains an adjustable gripper with four finger appendages. This finger grip size can be adjusted so that the device can grip and throw small, medium, or large size toys. This is useful to play with small medium or large size toys, as appropriate by breed or age of the dog. Additionally the present invention's gripper design is unique in that it can pick up dog toys that are not round such as footballs or plush toys like dolls.

DETAILED DESCRIPTION OF INVENTION

Specifications

As shown in the accompanying FIGS. 1-11 a toy throwing device includes a top "gripper" component (1) with the capability of engaging at least one point of contact with the toy that is intended to be picked up and thrown. The top shape of the "gripper" preferably being two finger-like cylinder projections (2) approximately 6 mm in diameter and 55 mm in length and projecting approximately 90 degrees from a cylinder shaft approximately 17 mm in diameter (3). Said shaft (3) of top "gripper" component being capable of interacting in a male/female connection with complimentary gripper components (4). Said complimentary components of gripper (4) preferred embodiments being two finger-like cylinders measuring approximately 6 mm in diameter and 55 mm in length (5) and projecting approximately 90 degrees from a 17 mm cylinder shaft (6). While these are the current preferred embodiments of the shape of the gripper for the current invention alternate gripper shapes such as sections of the surface of a sphere or square could be used in place of the finger like cylinder projections (2),(5). While the interaction of the components facilitating the contracting and the expansion of the gripper may be accomplished by a variety of mechanical means, the current preferred embodiment of mechanical design is for the bottom cylinder of the gripper component (6) to have symmetrical holes in its shaft wall along both sides of its length (7) capable of holding a locking button in place (8). Said locking button (8) can be an integrated aspect of the shaft design and part of either the top or the bottom gripper component, or a separate piece entirely as is the preferred embodiment of the current invention (8). The current design utilizes the button (8) inside the cylinder of the top gripper component (3) and the holes necessary to receive and use the button (9). The top gripper component male cylinder (10M) can then slide into the bottom gripper female cylinder (10F) and utilize the multiple holes arrangements along its length (7) to set the gripper size. The joined top gripper (1) and bottom gripper (4) once combined (11) can then be attached to an extension pole (12) or the handle (14) via a similar male female connection as with the top gripper and bottom gripper. The bottom of the cylinder of the bottom gripper (10M) with the button inside the bottom gripper (9B) can be fitted into either the extension pole, also called elongated shaft (12) via the female cylinder and button hole (13F,15) or connect directly to the handle (14) via the female cylinder and button hole (17F,16). The materials used for any of the components mentioned could be plastic or metal, or other polymer of similar strength and flexibility.

LIST OF PARTS

Figure 1:
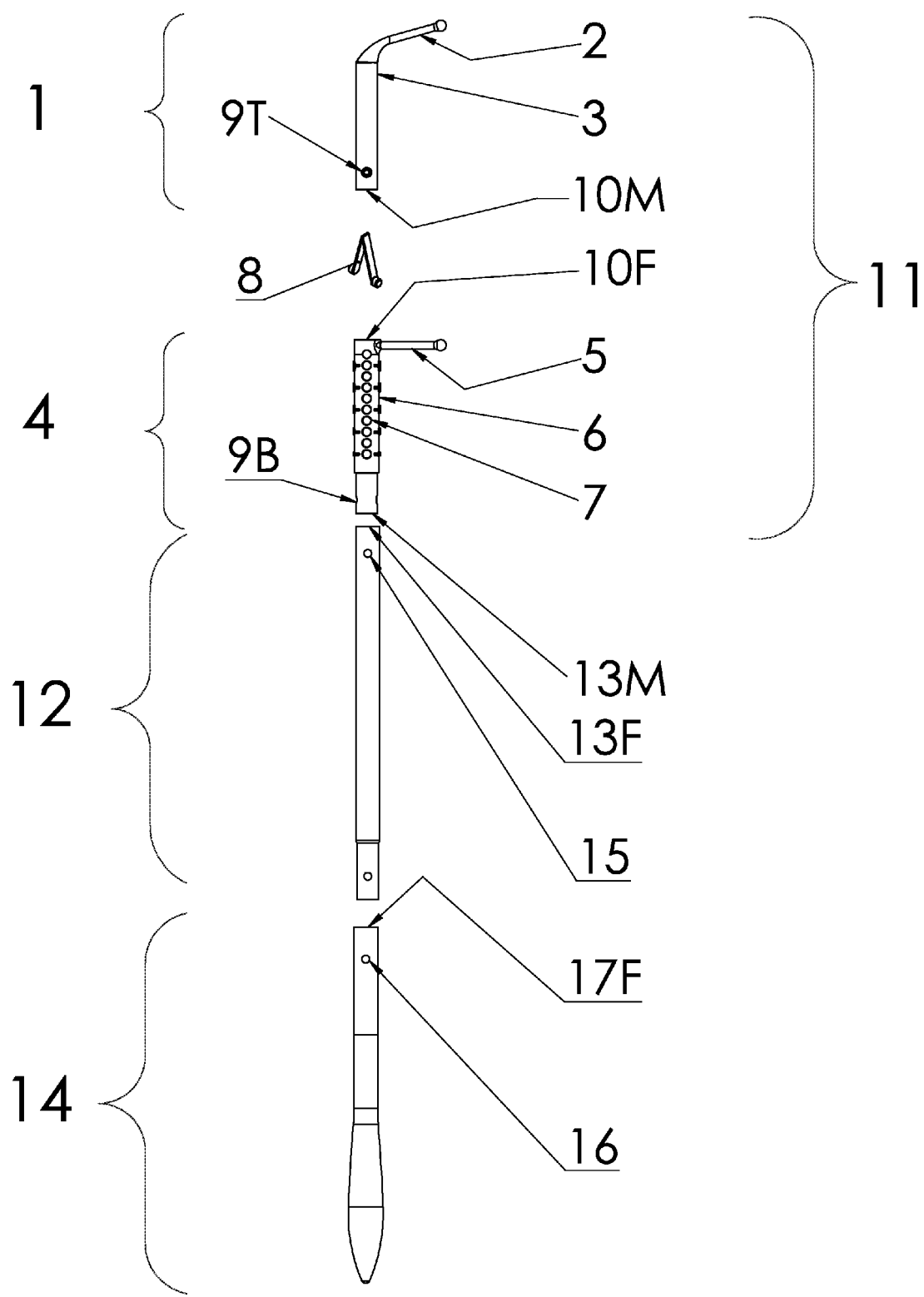
FIG. 1 is an exploded perspective of all the separate components
Figure 2:
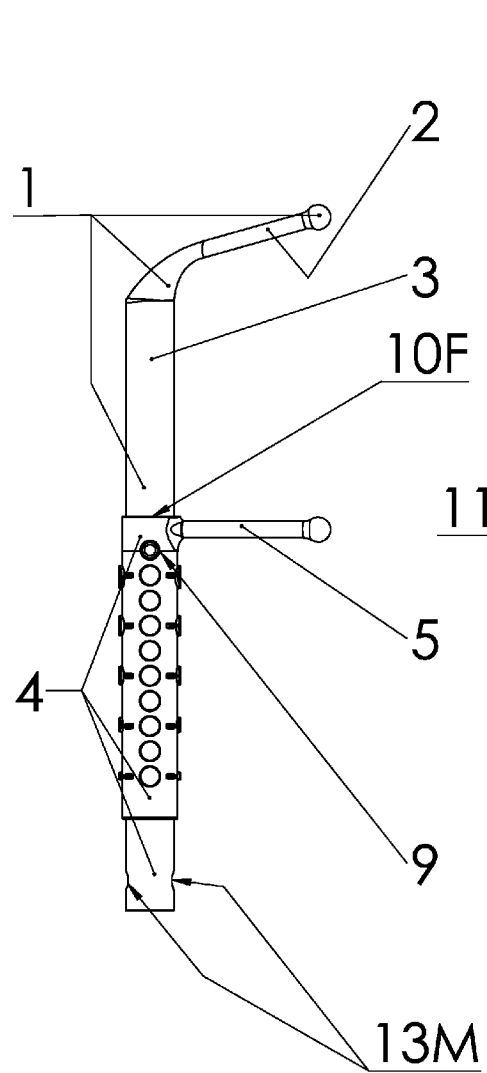
FIG. 2 is a side view of the top and bottom gripper in a fitted and connected position FIG. 3. is a back view of the top and bottom gripper in a fitted and connected position FIG. 4. is a cross section of the top and bottom gripper in a fitted and connected position FIG. 5. Is a side view of all the fetch pro components put together FIG. 6. Is a back view of all the fetch pro components put together FIG. 7. Is a side view of the fetch pro holding a ball FIG. 8. Is a front view of the fetch pro holding a ball FIG. 9. Is the opposite side view of the fetch pro holding a ball FIG. 10. Is a top view of the fetch pro holding a ball FIG. 11. Is a bottom view of the fetch pro holding a ball
Figure 3:
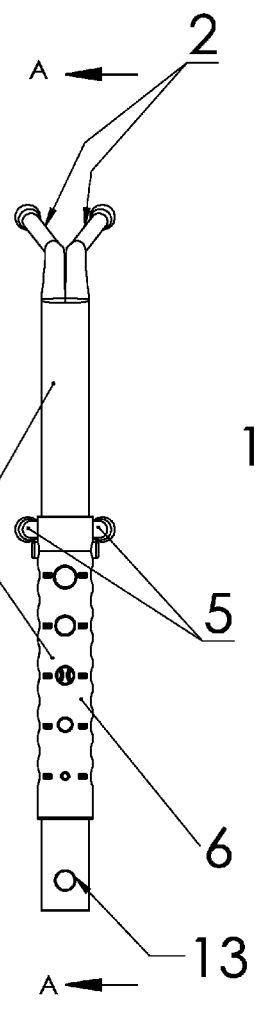
Figure 4:
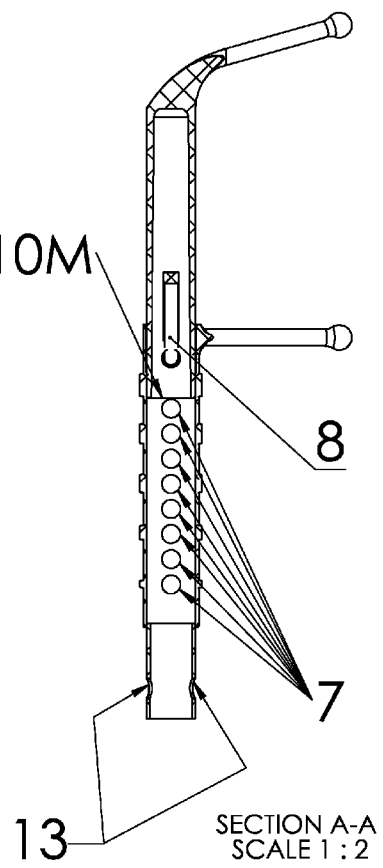
Figure 5:
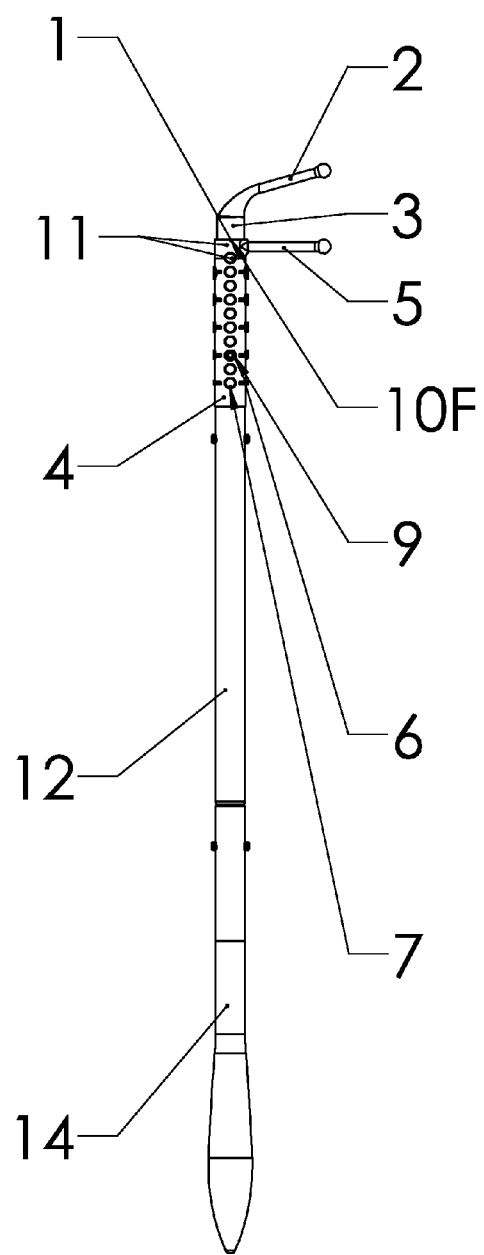
Figure 6:
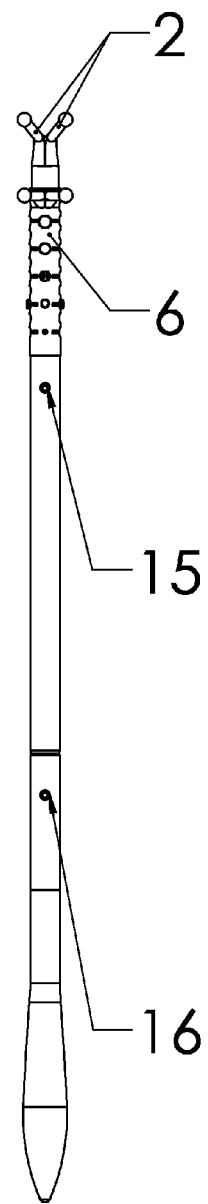
Figure 7:
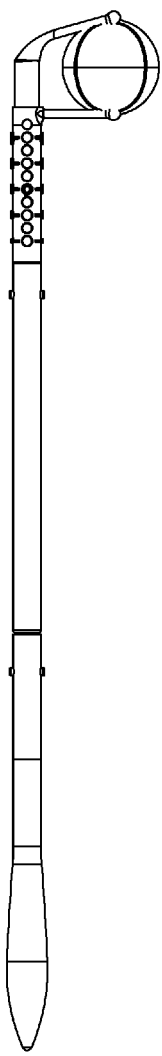
Figure 8:
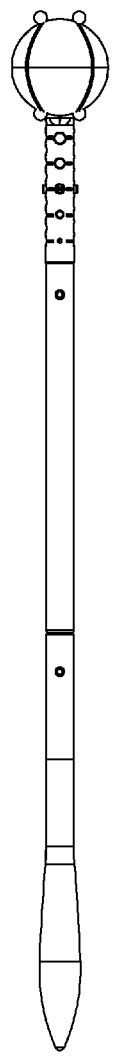
Figure 9:
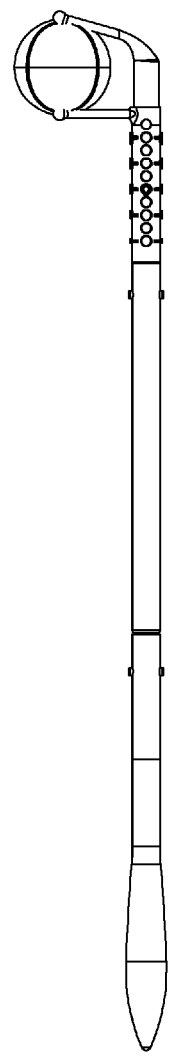
Figure 10:
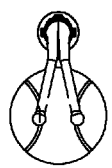
Figure 11:
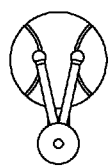

1. Entire Top gripper
2. Top fingers
3. Top gripper cylinder
4. Entire Bottom gripper
5. Bottom gripper fingers
6. Bottom gripper cylinder
7. Bottom gripper size adjustment holes
8. Button
9T. Top gripper connecting hole
9B. Bottom Gripper connecting hole
10M. Bottom of top gripper cylinder, male fitting
10F. Top of bottom gripper cylinder, female fitting
11. Top and Bottom Grippers together
12. Extension pole
13M. Bottom of bottom gripper, male fitting
13F. Top of extension pole, female fitting
14. Handle
15. Extension pole hole 16. Handle hole
17F. top of handle, female fitting

The invention claimed is:

1. A dog toy gripping and throwing device comprising:
   A. An elongated shaft having a longitudinal axis and opposite distal and proximal ends; and
   B. an adjustable gripper on said distal end of said elongated shaft, the adjustable gripper comprising a gripper component female cylinder and a top gripper male cylinder component whereby the distance between the gripper components can be adjusted to accommodate gripping and throwing different size and shape dog toys; and
   C. said gripper having flexible finger-like cylinders projecting transversely from the gripper component female cylinder which receives a telescoping top gripper male cylinder component also having transversely projecting flexible finger-like cylinders, and including a locking component with a plurality of holes for receiving a button to selectively set the gripper size.

* * * * *